US012113360B2

(12) United States Patent
Wang et al.

(10) Patent No.: US 12,113,360 B2
(45) Date of Patent: Oct. 8, 2024

(54) METHOD AND DEVICE FOR FORECASTING ELECTRIC LOAD, AND ELECTRONIC DEVICE

(71) Applicant: Shanghai Makesens Energy Storage Technology Co., Ltd., Shanghai (CN)

(72) Inventors: Decheng Wang, Shanghai (CN); Peng Ding, Shanghai (CN); Weikun Wu, Shanghai (CN); Haowen Ren, Shanghai (CN); Yuan Feng, Shanghai (CN); Wei Song, Shanghai (CN); Guopeng Zhou, Shanghai (CN); Zonglin Cai, Shanghai (CN); Xiao Yan, Shanghai (CN); Enhai Zhao, Shanghai (CN)

(73) Assignee: SHANGHAI MAKESENS ENERGY STORAGE TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/242,558

(22) Filed: Sep. 6, 2023

(65) Prior Publication Data

US 2024/0113519 A1 Apr. 4, 2024

(30) Foreign Application Priority Data

Sep. 26, 2022 (CN) .......................... 202211173100.5

(51) Int. Cl.
*H02J 3/00* (2006.01)
*G06Q 50/06* (2024.01)

(52) U.S. Cl.
CPC .............. *H02J 3/003* (2020.01); *G06Q 50/06* (2013.01); *H02J 2203/20* (2020.01)

(58) Field of Classification Search
CPC ....... H02J 3/003; H02J 2203/20; G06Q 50/06
See application file for complete search history.

(56) References Cited

U.S. PATENT DOCUMENTS 7,403,901 B1 * 7/2008 Carley .................... G16Z 99/00
705/2
7,644,863 B2 * 1/2010 Chen ...................... G06Q 10/06
705/28

(Continued)

FOREIGN PATENT DOCUMENTS

CN 111666276 A 9/2020
CN 112488415 A 3/2021

(Continued)

OTHER PUBLICATIONS

Chinese Office Action Corresponding to Application No. 202211173100. 5, mailed May 7, 2023.

(Continued)

*Primary Examiner* — Ziaul Karim
(74) *Attorney, Agent, or Firm* — Yue (Robert) Xu; Apex Attorneys at Law

(57) ABSTRACT

A method and a device for forecasting an electric load, an electronic device, and a computer-readable storage medium are provided. The method includes: acquiring historical load data prior to a forecast date; generating a load sequence based on the historical load data; performing variational mode decomposition on the load sequence, to obtain multiple intrinsic mode components and a residual that are corresponding to the load sequence; and inputting the multiple intrinsic mode components and the residual into respective forecasting models, and determining a load value on the forecast date based on forecasting results of all the forecasting models.

7 Claims, 8 Drawing Sheets

(56) References Cited

U.S. PATENT DOCUMENTS

| | | | | |
|---|---|---|---|---|
| 2008/0027841 A1* | 1/2008 | Eder | .................. | G06Q 40/00 |
| | | | | 705/35 |
| 2010/0094573 A1* | 4/2010 | Yang | .................. | H02J 3/00 |
| | | | | 702/61 |
| 2011/0040596 A1* | 2/2011 | Chen | .................. | G06Q 50/04 |
| | | | | 705/28 |
| 2013/0096983 A1* | 4/2013 | Forbes | .................. | G06Q 10/04 |
| | | | | 705/7.31 |
| 2013/0204661 A1* | 8/2013 | Grichnik | .................. | G06Q 10/04 |
| | | | | 705/7.31 |
| 2018/0366953 A1* | 12/2018 | DeTommasi | .................. | H02J 3/004 |
| 2022/0045509 A1* | 2/2022 | He | .................. | H02J 3/003 |
| 2022/0101097 A1* | 3/2022 | Liu | .................. | G06N 20/10 |

FOREIGN PATENT DOCUMENTS

| | | |
|---|---|---|
| CN | 114254800 A | 3/2022 |
| CN | 114548586 A | 5/2022 |
| EP | 3968247 A1 | 3/2022 |

OTHER PUBLICATIONS

Wei Ao, Mao Da-jun, Han Wan-li, et al. Short-term load forecasting based on EMD and long short-term memory neural networks. Journal of Engineering for Thermal Energy and Power, 2020, 35(4) : 203-209 (Apr. 2020).

\* cited by examiner

METHOD AND DEVICE FOR FORECASTING ELECTRIC LOAD, AND ELECTRONIC DEVICE

CROSS-REFERENCE TO RELATED APPLICATION

This application claims priority to Chinese Patent Application No. 202211173100.5, filed on Sep. 26, 2022, which is incorporated herein by its reference in its entirety.

FIELD

The present application relates to the technical field of load analysis, and in particular to a method and a device for forecasting an electric load, an electronic device, and a computer-readable storage medium.

BACKGROUND

In an integrated energy management system, whether a load trend in the future can be effectively forecasted has become one of key points for safe and reasonable planning of energy storage. Accurate load forecasting can be used as the basis for system planning and scheduling, so that energy storage equipment can be started and stopped reasonably, effectively reducing costs as well as improving economic benefits and energy utilization. In addition, various provinces, cities and regions are actively responding to the reform of the power spot market based on the reform of the domestic power system. Against this background, major business segments such as trading strategies and quotation strategies of some electricity sales companies are also inseparable from accurate load forecasting.

Researches on electric load forecasting have been carried out for years in the industry, and there are many methods, for example, a simple forecasting method based on data periodicity, that is, directly taking the actual value of the corresponding time position in the previous time period as the forecasted value of the day. This method has certain practicability in scenarios with simple working conditions. However, with the lengthening of the time period, it is difficult to forecast the fluctuation trend of the electric load in time relying solely on the periodic law. There are also methods using neural networks, such as the recurrent neural network and the long-term and short-term neural network which are good at solving time series problems, in order to solve nonlinear problems in load data. However, it is impossible to use these methods to mine more feature information from the electric load data with only a single feature, resulting in unsatisfactory forecasting results.

SUMMARY

In order to solve the existing technical problems, a method and a device for forecasting an electric load, an electronic device, and a computer-readable storage medium are provided according to embodiments of the present application.

In a first aspect, a method for forecasting an electric load is provided according to an embodiment of the present application. The method includes: acquiring historical load data prior to a forecast date, where the historical load data includes load values at multiple times; generating a load sequence based on the historical load data; performing variational mode decomposition on the load sequence, to obtain multiple intrinsic mode components and a residual that are corresponding to the load sequence; and inputting the multiple intrinsic mode components and the residual into respective forecasting models, and determining a load value on the forecast date based on forecasting results of all the forecasting models.

In an embodiment, the acquiring the historical load data prior to the forecast date includes: acquiring raw load data prior to the forecast date; and replacing an outlier in the raw load data to generate the historical load data.

In an embodiment, the replacing the outlier in the raw load data to generate the historical load data includes: determining a first normal value earlier than the outlier and closest to the outlier, and determining a second normal value later than the outlier and closest to the outlier; and determining a value that is to replace the outlier based on the first normal value and the second normal value, where the determined value satisfies:

$$Y(t_k) = \frac{t_b - t_k}{t_b - t_a} Y(t_a) + \frac{t_k - t_a}{t_b - t_a} Y(t_b)$$

where $t_k$ represents a time corresponding to the outlier, $Y(t_k)$ represents the value that is to replace the outlier, $t_a$ represents a time corresponding to the first normal value, $Y(t_a)$ represents the first normal value, $t_b$ represents a time corresponding to the second normal value, and $Y(t_b)$ represents the second normal value.

In an embodiment, the generating the load sequence based on the historical load data includes: converting the historical load data into a historical load sequence; and denoising the historical load sequence to generate the load sequence.

In an embodiment, the denoising the historical load sequence to generate the load sequence includes: performing n rounds of decomposition on a target sequence until a cycle ends, where the target sequence of a first round is the historical load sequence, and n is the number of the intrinsic mode components; and generating the load sequence by combining a low-frequency sequence $L_n$ in a last round and high-frequency sequences newly generated in all the n rounds, where an i-th round of decomposition includes: decomposing a target sequence $L_{i-1}$ of the i-th round into a low-frequency sequence $L_i$ and a high-frequency sequence $H_i$, where the low-frequency sequence $L_i$ is a low-frequency component of the target sequence $L_{i-1}$, and the high-frequency sequence $H_i$ is a high-frequency component of the target sequence $L_{i-1}$; retaining a part of the high-frequency sequence $H_i$ that is not smaller than a preset threshold, and newly generating a high-frequency sequence $H'_i$; and determining the low-frequency sequence $L_i$ of the i-th round as the target sequence in a next round until the cycle ends.

In an embodiment, the performing the variational mode decomposition on the load sequence includes: normalizing the load sequence, and performing the variational mode decomposition on the normalized load sequence. The determining the load value on the forecast date based on the forecasting results of all the forecasting models includes: de-normalizing the forecasting results of all the forecasting models and determining the load value on the forecast date by combining the denormalized forecasting results of all the forecasting models.

In a second aspect, a device for forecasting an electric load is provided according to an embodiment of the present application. The device includes: an acquisition module, a sequence generation module, a mode decomposition module and a forecast module. The acquisition module is configured to acquire historical load data prior to a forecast date. The historical load data includes load values at multiple times. The sequence generation module is configured to generate a load sequence based on the historical load data. The mode decomposition module is configured to perform variational mode decomposition on the load sequence to obtain multiple intrinsic mode components and a residual that are corresponding to the load sequence. The forecast module is configured to input the multiple intrinsic mode components and the residual into respective forecasting models, and determine a load value on the forecast date based on forecasting results of all the forecasting models.

In an embodiment, the acquisition module includes an acquisition unit and a replacement unit. The acquisition unit is configured to acquire raw load data prior to the forecast date. The replacement unit is configured to replace an outlier in the raw load data to generate the historical load data.

In a third aspect, an electronic device is provided according to an embodiment of the present application. The electronic device includes a bus, a transceiver, a memory, a processor, and a computer program stored on the memory and executable on the processor. The transceiver, the memory and the processor are connected to each other through the bus. The computer program, when executed by the processor, implements the steps in the method for forecasting the electric load described above.

In a fourth aspect, a computer-readable storage medium, on which a computer program is stored, is provided according to an embodiment of the present application. The computer program, when executed by a processor, implements the steps in the method for forecasting the electric load described above.

With the method and the device for forecasting an electric load, the electronic device, and the computer-readable storage medium according to embodiments of the present application, after being determined, the load sequence prior to the forecast date is decomposed based on the variational mode decomposition, so that multiple intrinsic mode components in different frequency domains are obtained, and more dimensional feature information in the load sequence can be mined. Moreover, the residual obtained from the variational mode decomposition is also used as valid data. The forecasting model is also trained for the residual mentioned above, and the residual obtained after the decomposition is inputted into the forecasting model. Forecasting results for all the intrinsic mode components and the residual are combined to obtain the final forecasting result, so that the load value on the forecast date can be accurately forecasted.

BRIEF DESCRIPTION OF THE DRAWINGS

The drawings to be used in the embodiments of the present application or the background art are described below in order to more clearly illustrate the technical solutions in the embodiments of the present application or the background art.

DETAILED DESCRIPTION

Embodiments of the present application are described below with reference to the drawings in the embodiments of the present application.

Figure 1:
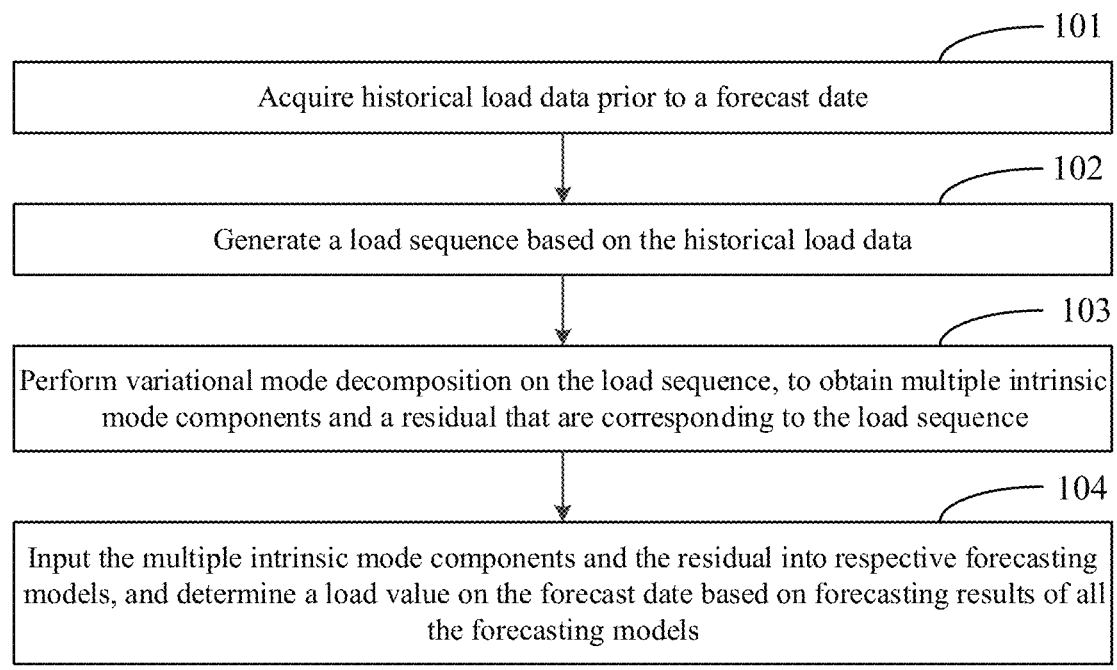
FIG. 1 schematically shows a flow chart of a method for forecasting an electric load according to an embodiment of the present application.

FIG. 1 schematically shows a flow chart of a method for forecasting an electric load according to an embodiment of the present application. As shown in FIG. 1, the method includes the following steps 101 to 104.

In step 101, historical load data prior to a forecast date is acquired. The historical load data includes load values at multiple times.

In the embodiment of the present application, a date is called the forecast date in order to forecast the load (electric load) that a power system is to consume on this date, and load data of the power system prior to the forecast date is acquired. The load data represents load values at multiple times, that is, changes in the load value over time. For convenience of description, the load data prior to the forecast date is referred to as the historical load data in the embodiment of the present application.

The historical load data should have a long enough time span to ensure the accuracy of subsequent forecasting. For example, the historical load data is greater than m times the forecast date in time span, where m is greater than 10, for example, 30. Generally, the load within one day is forecasted, that is, the time span of the forecast date is one day, and the time span of the historical load data is greater than m days. For example, load data for 30 days or three months prior to the forecast date are acquired. For example, the load data is sampled at intervals of 15 minutes, and a total of 96 load values are sampled a day. Therefore, 96×m load values prior to the forecast date serve as the historical load data.

In step 102, a load sequence is generated based on the historical load data.

In step 103, variational mode decomposition is performed on the load sequence to obtain multiple intrinsic mode components and a residual that are corresponding to the load sequence.

In the embodiment of the present application, the load forecasting is realized based on the variational mode decomposition (VMD). The historical load data is expressed in a sequence, that is, a corresponding load sequence is generated based on the historical load data, for example, a load sequence obtained by directly converting the historical load data containing load values at multiple times. In the embodiment of the present application, the load sequence is represented in a standard format. For example, this load sequence contains two columns, one for time and the other for the corresponding load value. For example, one piece of the data is as follows:

Time: 2022-02-02 00:00:00

Value: 100

After being determined, the load sequence is subjected to the variational mode decomposition, so that the multiple corresponding intrinsic mode components are determined. Specifically, the intrinsic mode component may be an intrinsic mode function (IMF) determined after the variational mode decomposition. In the embodiment of the present application, the corresponding residual is also determined.

The variational mode decomposition is to continuously update each mode in the frequency domain, and then use Fourier transform to transfer the frequency domain to the time domain so as to obtain the corresponding intrinsic mode function. For example, the load sequence is x(t), and n intrinsic mode components are to be obtained from decomposition, and each intrinsic mode component is expressed as $\mu_k(t)$, where k=1, 2, . . . , n, and n represents the total number of modes, for example, k=3. Correspondingly, all the intrinsic mode components are subtracted from the load sequence to obtain the residual $\mu_{residual}(t)$ as follows.

$$\mu_{residual}(t) = x(t) - \sum_{k=1}^{n} \mu_k(t) \quad (1)$$

In the embodiment of the present application, different intrinsic mode components obtained from the variational mode decomposition correspond to different frequency domains, and represent different frequency domain information. Compared with the load sequence with only a single feature, more dimensional features can be mined, thereby improving the accuracy of subsequent forecasting. Moreover, in the traditional way of applying the variational mode decomposition, the residual is generally regarded as an error or noise and is not processed. In the process of realizing the present invention, it is found that the residual also contains the feature of the load sequence, and even contains rich information. Therefore, in the embodiment of the present application, the residual is also determined, so as to facilitate subsequent load forecasting based on the residual.

In step 104, the multiple intrinsic mode components and the residual are inputted into respective forecasting models, and a load value on the forecast date is determined based on forecasting results of all the forecasting models.

In the embodiment of the present application, multiple forecasting models are pre-trained. The multiple forecasting models correspond one-to-one to the multiple intrinsic mode components and the residual. For example, the number of intrinsic mode components (that is, the total number of modes) is n, and the number of the forecasting models is n+1. n forecasting models are used to respectively acquire the forecasting results of the corresponding intrinsic mode components. The last forecasting model is used to acquire the forecasting result of the residual. Since the intrinsic mode components and the residual are both in the form of sequences, the forecasting model is specifically a recurrent neural network, such as LSTM (Long Short-Term Memory) and the like. After determining the forecasting results for all the intrinsic mode components and the residual, all the forecasting results are integrated to obtain the final forecasting result, that is, the load value on the forecasting date.

Figure 2:
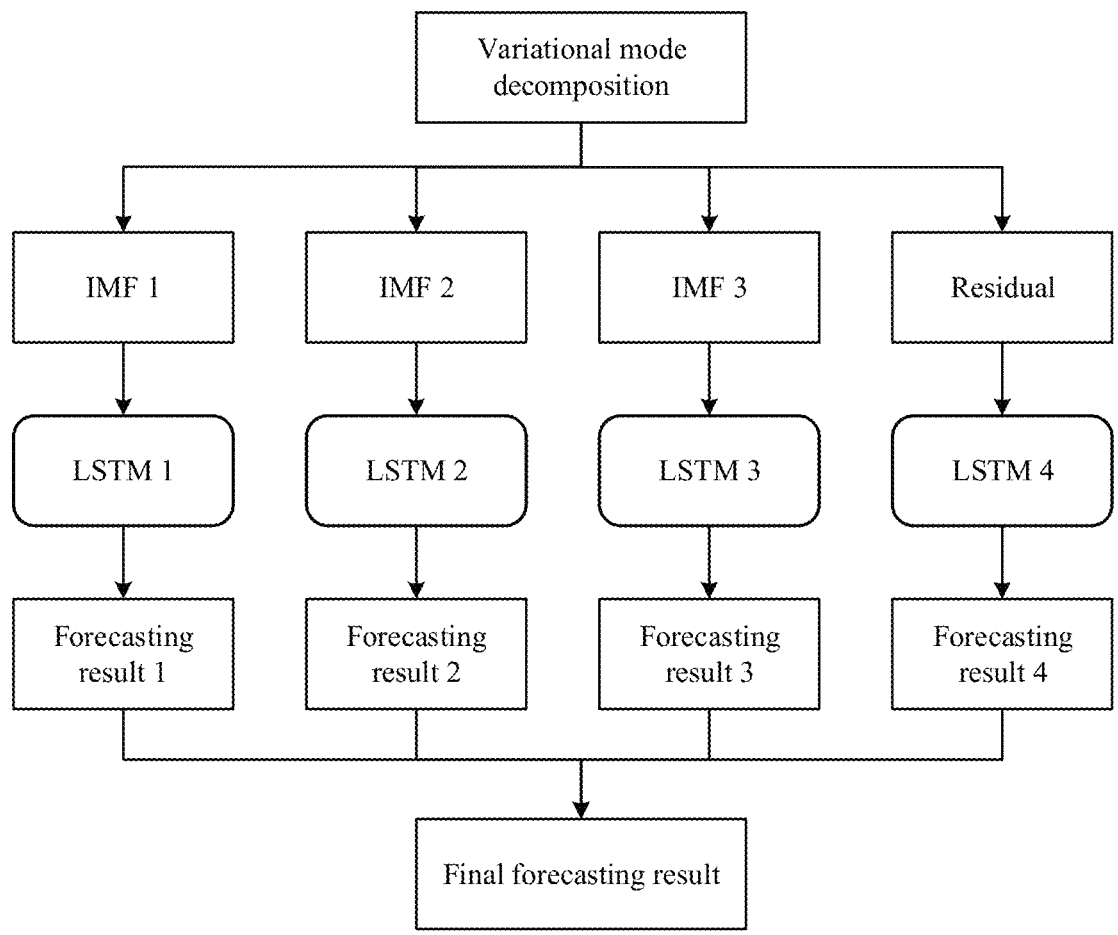
FIG. 2 schematically shows principle of load forecasting based on variational modal decomposition according to an embodiment of the present application.

For example, FIG. 2 schematically shows principle of load forecasting based on the variational modal decomposition. The load sequence is decomposed into three intrinsic mode components (IMF 1, IMF 2, IMF 3) and a residual based on the variational modal decomposition, i.e., n=3. Four LSTMs are pre-trained. IMF 1, IMF 2, IMF 3 and the residual are inputted into LSTM 1, LSTM 2, LSTM 3, and LSTM 4 respectively, and a forecasting result 1, a forecasting result 2, a forecasting result 3, and a forecasting result 4 are obtained. These four forecasting results are integrated to obtain the final forecasting result. For example, the final forecasting result is determined based on ensemble learning. The forecasting results of the three intrinsic mode components are $p_1(t)$, $p_2(t)$, $p_3(t)$, respectively, and the forecasting result 4 of the residual is $p_{residual}(t)$, and then the final forecasting result $p_{final}(t)$ is expressed as $p_{final}(t)=p_1(t)+p_2(t)+p_3(t)+p_{residual}(t)$.

In the method for forecasting electric load according to the embodiment of the present application, after being determined, the load sequence prior to the forecast date is decomposed based on the variational mode decomposition, so that multiple intrinsic mode components in different frequency domains are obtained, and more dimensional feature information in the load sequence can be mined. Moreover, the residual obtained from the variational mode decomposition is also used as valid data. The forecasting model is also trained for the residual mentioned above, and the residual obtained after the decomposition is inputted into the forecasting model. Forecasting results for all the intrinsic mode components and the residual are combined to obtain the final forecasting result, so that the load value on the forecast date can be accurately forecasted.

Optionally, the acquired load data (that is, raw historical data described below) is directly used as the historical load data. Alternatively, the above step 101 of "acquiring the historical load data prior to the forecast date" may include the following steps A1 to A2.

In step A1, raw load data prior to the forecast date is acquired.

In step A2, an outlier in the raw load data is replaced to generate the historical load data.

In the embodiment of the present application, the load data prior to the forecast date directly acquired is referred to as the raw load data. During the acquisition, there may be an outlier in the acquired raw load data due to various problems. For example, some load values are too large or too small, or no load value is acquired at a time. In this embodiment of the present application, the outlier is replaced with a normal value, so as to prevent the outlier from affecting the accuracy of subsequent forecasting.

Optionally, the above step A2 of "replacing the outlier in the raw load data" includes the following steps A21 to A22.

In step A21, a first normal value earlier than the outlier and closest to the outlier, and a second normal value later than the outlier and closest to the outlier are determined.

In step A22, a value that is to replace the outlier is determined based on the first normal value and the second normal value, and the determined value satisfies the following formula.

$$Y(t_k) = \frac{t_b - t_k}{t_b - t_a} Y(t_a) + \frac{t_k - t_a}{t_b - t_a} Y(t_b) \quad (2)$$

$t_k$ represents the time corresponding to the outlier, $Y(t_k)$ represents the value that is to replace the outlier, $t_a$ represents the time corresponding to the first normal value, $Y(t_a)$ represents the first normal value, $t_b$ represents the time corresponding to the second normal value, and $Y(t_b)$ represents the second normal value.

In the embodiment of the present application, after the outlier in the raw load data is determined, the normal values before, after and closest to the outlier, that is, the first normal value and the second normal value are determined in order to replace the outlier. The closest means the closest in time.

For example, in the raw load data, the value at time $t_k$ is the outlier, and the first normal value closest to the outlier is searched for before the time $t_k$. The time corresponding to the first normal value is represented as $t_a$ ($t_k>t_a$), and the first normal value is represented as $Y(t_a)$. Similarly, the second normal value closest to the outlier is searched for after the time $t_k$. The time corresponding to the second normal value is represented as $t_b$ ($t_b>t_k$), and the second normal value is represented as $Y(t_b)$.

In the embodiment of the present application, the value that is to replace the outlier is determined by weighting the first normal value and the second normal value. The closer the normal value is to the outlier, the more approximate it is to the normal value at the outlier (that is, the value that is to replace the outlier), and the greater its weight. Therefore, in the embodiment of the present application, the two normal values $Y(t_a)$ and $Y(t_b)$ are weighted with the weights shown in the formula (2), so that the value that is to replace the outlier, that is, the normal value $Y(t_k)$ at time $t_k$ can be determined more accurately.

Optionally, the load sequence is denoised to reduce the interference of noise. Specifically, the above step 102 of "generating the load sequence based on the historical load data" includes the following steps B1 to B2.

In step B1, the historical load data is converted into a historical load sequence.

In step B2, the historical load sequence is denoised to generate the load sequence.

In the embodiment of the present application, the historical load data is directly converted into the load sequence, and the converted load sequence is called the historical load sequence. Noise may exist in the historical load sequence. By denoising the historical load sequence, the noise in the required load sequence can be reduced and therefore the accuracy of subsequent forecasting can be guaranteed.

Optionally, the above step B2 of "denoising the historical load sequence to generate the load sequence" includes the following steps B21 to B22.

In step B21, n rounds of decomposition are performed on a target sequence until the end of a cycle. The target sequence of the first round is the historical load sequence, and n is the number of intrinsic mode components.

In step B22, the load sequence is generated by combining a low-frequency sequence $L_n$ in the last round and high-frequency sequences newly generated in all the rounds.

In the above step B21, the i-th round of decomposition includes the following steps B211 to B213.

In step B211, the target sequence $L_{i-1}$ of the i-th round is decomposed into a low-frequency sequence $L_i$ and a high-frequency sequence $H_i$. The low-frequency sequence $L_i$ is the low-frequency component of the target sequence $L_{i-1}$. The high-frequency sequence Hi is the high-frequency component of the target sequence $L_{i-1}$.

In step B212, the part of the high-frequency sequence $H_i$ that is not smaller than a preset threshold is retained, and a high-frequency sequence $H'_i$ is newly generated.

In step B213, the low-frequency sequence $L_i$ of the i-th round is used as a newly generated target sequence until the cycle ends.

Figure 3A:
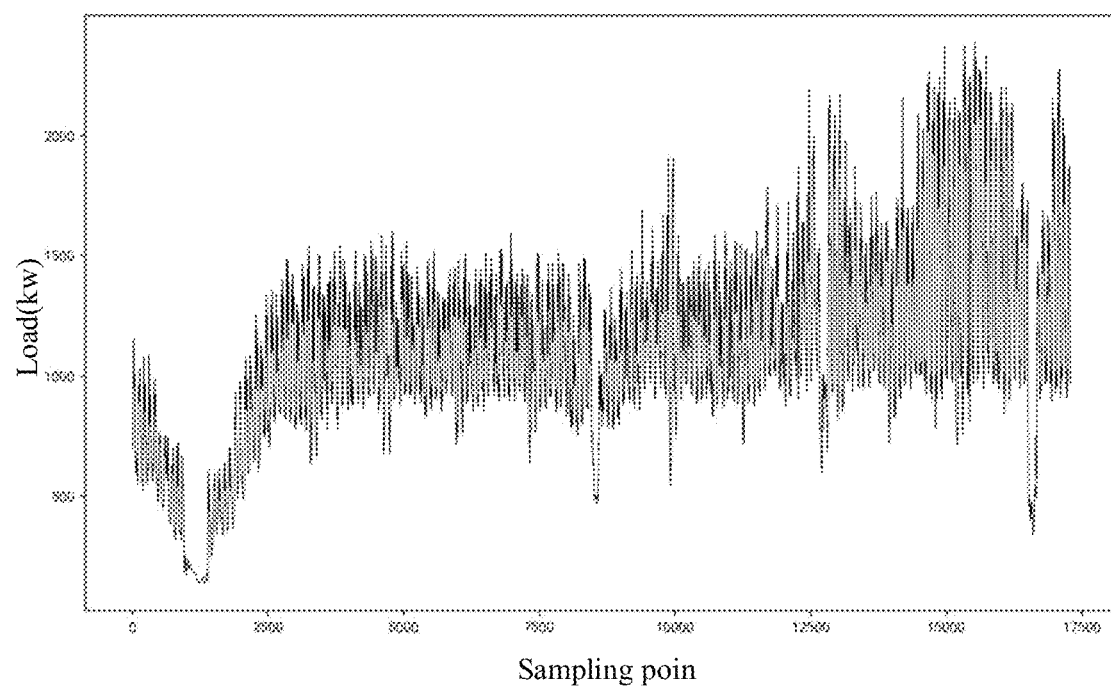
FIG. 3A schematically shows a load sequence according to an embodiment of the present application.
Figure 3B:
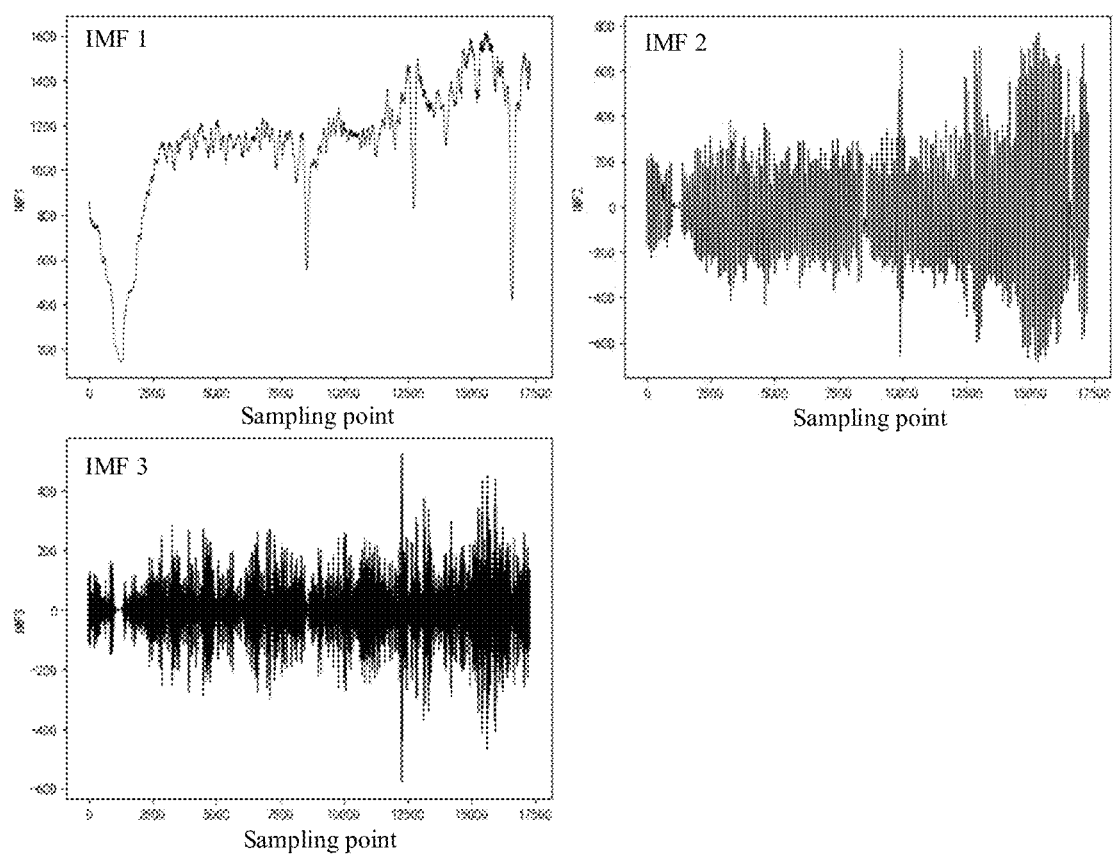
FIG. 3B schematically shows three intrinsic mode components according to an embodiment of the present application.
Figure 3C:
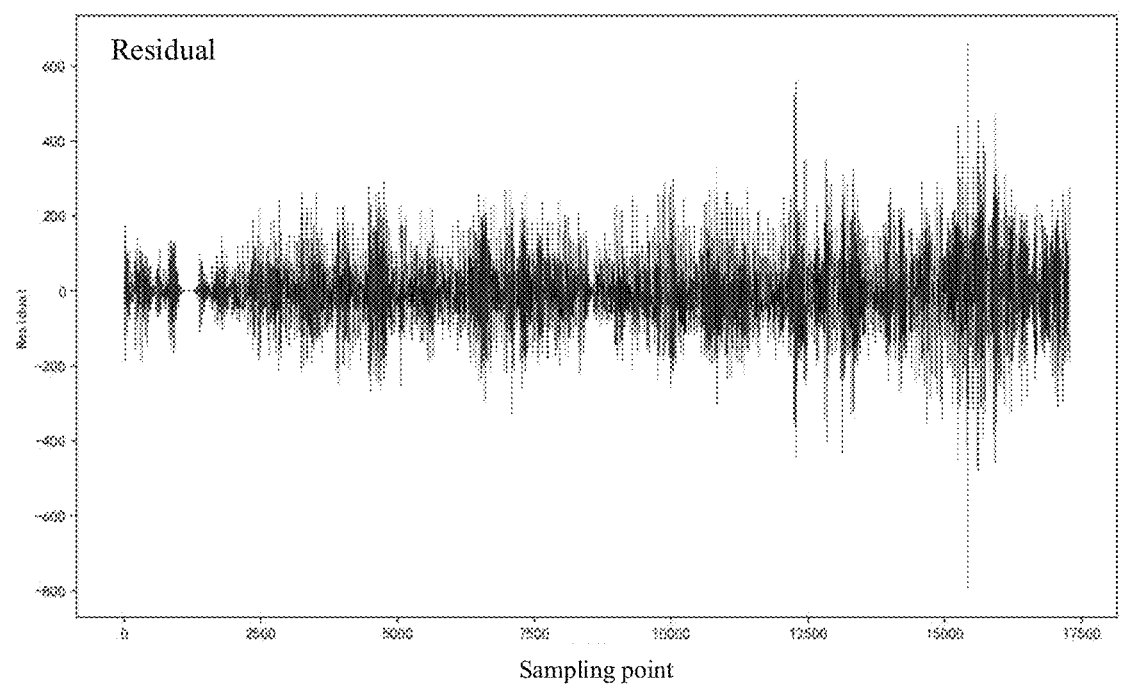
FIG. 3C schematically shows a residual according to an embodiment of the present application.

In the embodiment of the present application, multiple intrinsic mode components in different frequency domains are obtained from the variational mode decomposition. FIG. 3A shows a load sequence. After the load sequence is subjected to the variational mode decomposition, the obtained IMF 1, IMF 2, IMF 3 and the residual are seen in FIG. 3B and FIG. 3C. The abscissa in FIGS. 3A, 3B, and 3C represents sampling points at different times, and the ordinate represents the load value. Based on the characteristics of the variational mode decomposition, multiple high and low frequency decompositions are used for denoising, and the number of high and low frequency decompositions is the same as the number n of intrinsic mode components in the embodiment of the present application. Based on n rounds of decomposition, and the denoising on the high-frequency component, the denoising of different frequency domain information is realized.

Specifically, for the convenience of distinction in the description, the load sequence to be processed in each round is referred to as the target sequence in the embodiment of the present application. The historical load sequence is used as the target sequence of the first round in order to be denoised. That is, the first round of decomposition (i=1) is performed on the historical load sequence to obtain the low-frequency component and the high-frequency component of the historical load sequence, that is, the low-frequency sequence and the high-frequency sequence. The high-frequency sequence is to be denoised, and the low-frequency sequence is to serve as the target sequence for the next round until the end of the cycle, that is, until the number times for the decomposition reaches n. The target sequence may be decomposed into the low-frequency component and the high-frequency component by using a low-pass filter (e.g., a Gaussian filter), a wavelet decomposition function, etc., which is not limited in this embodiment.

Figure 4:
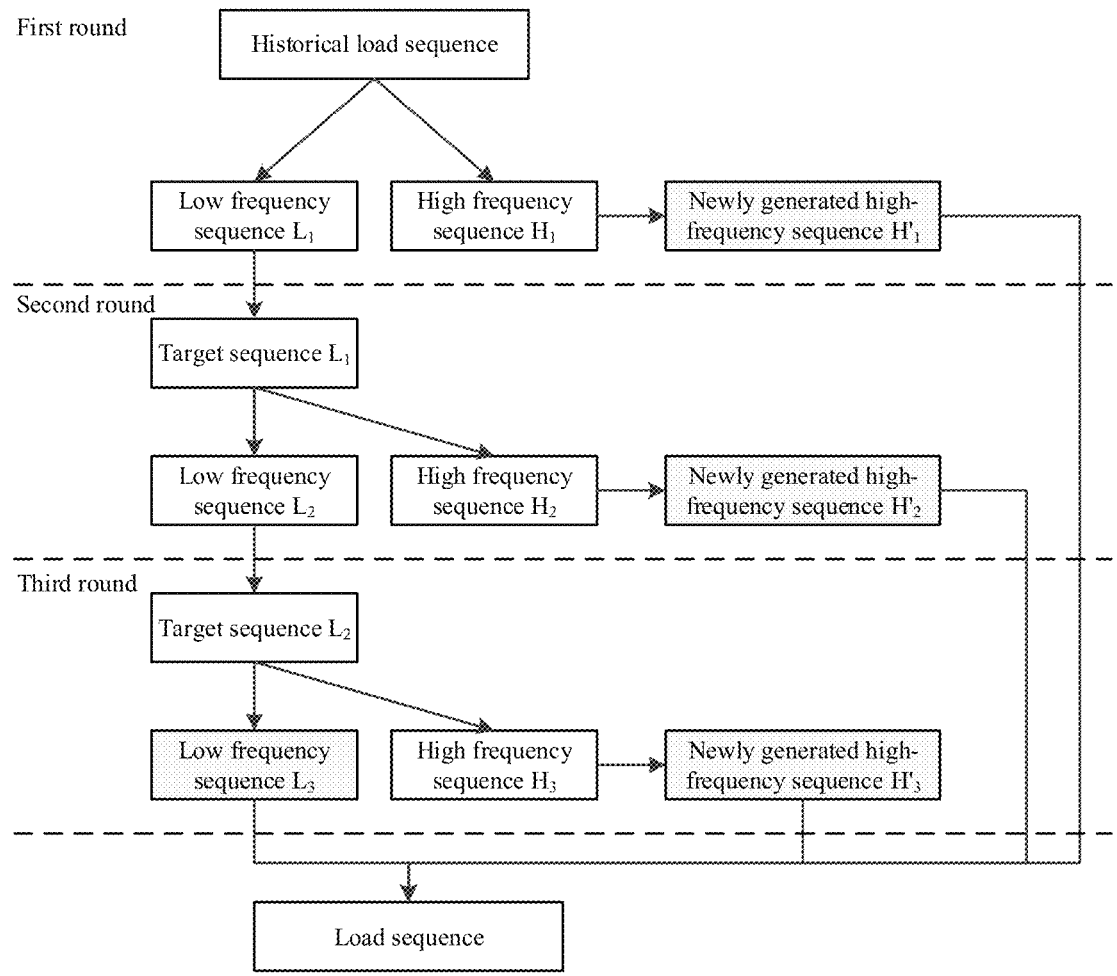
FIG. 4 schematically shows a flowchart of denoising according to an embodiment of the present application.

For example, the number of intrinsic mode components n is equal to 3, and therefore the decomposition is to be performed three rounds for denoising, as shown in FIG. 4.

In the first round of decomposition, the historical load sequence is the target sequence. That is, the target sequence $L_0$ is the historical load sequence, and the historical load sequence is decomposed into a low-frequency sequence $L_1$ and a high-frequency sequence $H_1$. In the high-frequency sequence $H_1$, the part smaller than the preset threshold is generally mainly composed of noise. In the embodiment of the present application, the preset threshold is used to denoise the high-frequency sequence $H_1$ so as to newly generate a high-frequency sequence $H'_1$ that contains no noise (or less noise). Further, the low-frequency sequence $L_1$ is used as the target sequence of the second round. The preset threshold may be constant, or a soft threshold depending on actual conditions, which is not limited in this embodiment.

In the second round of decomposition, the low-frequency sequence $L_1$ of the previous round is used as the target sequence of the second round, that is, the target sequence $L_1$. The target sequence $L_1$ is decomposed into a low frequency sequence $L_2$ and a high frequency sequence $H_2$. The high-frequency sequence $H_2$ is denoised to newly generate high-frequency sequence $H'_2$. Further, the low-frequency sequence $L_2$ is used as the target sequence of the third round.

In the third round of decomposition, the low-frequency sequence $L_2$ of the second round is used as the target sequence of the third round, that is, the target sequence $L_2$. The target sequence $L_2$ is decomposed into a low frequency sequence $L_3$ and a high frequency sequence $H_3$. The high-frequency sequence $H_3$ is denoised to newly generate a high-frequency sequence $H'_3$. In this case, the number of times for the decomposition reaches 3, and there is no need to further decomposition.

Afterwards, as shown in step B22 above, the load sequence is generated by combining the low-frequency sequence $L_3$ determined in the last round and the newly generated high-frequency sequences $H'_1$, $H'_2$, and $H'_3$ in all rounds. In the embodiment of the present application, the load sequence is the sum of the low-frequency sequence $L_n$ of the last round and the newly generated high-frequency sequences of all the rounds, that is, the load sequence x(t) satisfies the following formula (3).

$$x(t) = L_n + \sum_{i=1}^{n} H_i' \qquad (3)$$

In the embodiment of the present application, different high-frequency components can be denoised respectively through multiple rounds of decomposition. The number n of times for the decomposition is the same as the number of intrinsic mode components, which can reduce the interference of noise on each intrinsic mode component to a certain extent, and can improve the forecasting accuracy of each intrinsic mode component.

Optionally, the above step 103 of "performing the variational mode decomposition on the load sequence" includes the following step C1.

In step C1, the load sequence is normalized, and the normalized load sequence is subjected to the variational mode decomposition.

Moreover, the above step 104 of "determining the load value on the forecast date based on the forecasting results of all the forecasting models" includes the following step D1.

In step D1, the forecasting results of all the forecasting models are denormalized, and the denormalized forecasting results of all the forecasting models are combined to determine the load value on the forecast date.

In the embodiment of the present application, the load sequence is normalized before forecasting for the convenience of forecasting, and the multiple intrinsic mode components and the residual are obtained based on the decomposition of the normalized load sequence. In addition, the final forecasting result is denormalized (also referred to as denormalization), so that the final forecasting result can be expressed in the form of load, and therefore the forecasted load value, that is, the load value on the forecast date, can be obtained.

For example, the normalized load sequence $\overline{x(t)}$ satisfies the following formula (4).

$$\overline{x(t)} = \frac{x(t) - x_{min}}{x_{max} - x_{min}} \qquad (4)$$

$x_{min}$ represents a minimum value in the load sequence, and $x_{max}$ represents a maximum value in the load sequence.

The method for forecasting the electric load according to the embodiment of the present application has been described in detail above, and is also be implemented by a corresponding device. The device for forecasting the electric load according to an embodiment of the present application is described in detail below.

Figure 5:
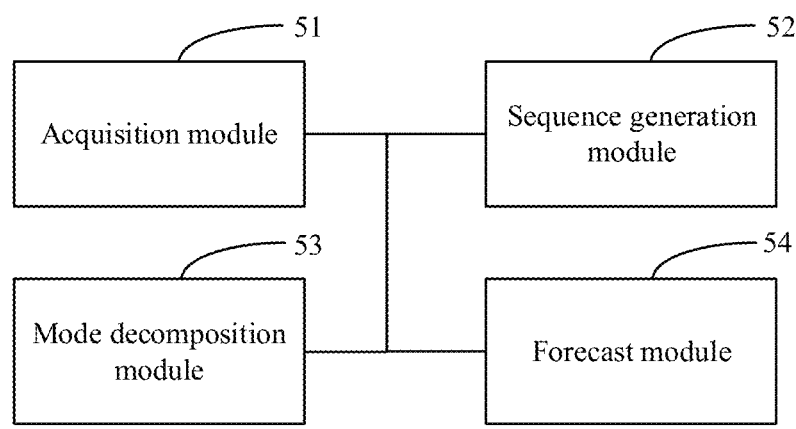
FIG. 5 schematically shows a device for forecasting an electric load according to an embodiment of the present application.

FIG. 5 schematically shows the device for forecasting an electric load according to an embodiment of the present application. As shown in FIG. 5, the device includes an acquisition module 51, a sequence generation module 52, a mode decomposition module 53 and a forecast module 54.

The acquisition module 51 is configured to acquire historical load data prior to a forecast date. The historical load data includes load values at multiple times.

The sequence generation module 52 is configured to generate a load sequence based on the historical load data.

The mode decomposition module 53 is configured to perform variational mode decomposition on the load sequence to obtain multiple intrinsic mode components and a residual that are corresponding to the load sequence.

The forecast module 54 is configured to input the multiple intrinsic mode components and the residual into respective forecasting models, and determine a load value on the forecast date based on forecasting results of all the forecasting models.

In an embodiment, the acquisition module 51 includes: an acquisition unit and a replacement unit.

The acquisition unit is configured to acquire raw load data prior to the forecast date.

The replacement unit is configured to replace an outlier in the raw load data to generate the historical load data.

In an embodiment, in order to replace the outlier in the raw load data, the replacement unit is configured to: determine a first normal value earlier than the outlier and closest to the outlier, and a second normal value later than the outlier and closest to the outlier; and determine a value that is to replace the outlier based on the first normal value and the second normal value. The determined value satisfies the following formula.

$$Y(t_k) = \frac{t_b - t_k}{t_b - t_a} Y(t_a) + \frac{t_k - t_a}{t_b - t_a} Y(t_b)$$

$t_k$ represents the time corresponding to the outlier, $Y(t_k)$ represents the value that is to replace the outlier, $t_a$ represents the time corresponding to the first normal value, $Y(t_a)$ represents the first normal value, $t_b$ represents the time corresponding to the second normal value, and $Y(t_b)$ represents the second normal value.

In an embodiment, the sequence generation module 52 includes a conversion unit and a denoising unit.

The conversion unit is configured to convert the historical load data into a historical load sequence.

The denoising unit is configured to denoise the historical load sequence to generate the load sequence.

In an embodiment, in order to denoise the historical load sequence to generate the load sequence, the denoising unit is configured to: perform n rounds of decomposition on a target sequence until the end of the cycle, where the target sequence of the first round is the historical load sequence, and n is the number of intrinsic mode components; and generate the load sequence by combining a low-frequency sequence $L_n$ in the last round and high-frequency sequences newly generated in all the rounds.

The i-th round of decomposition is performed as follows. The target sequence $L_{i-1}$ of the i-th round is decomposed into a low-frequency sequence $L_i$ and a high-frequency sequence $H_i$. The low-frequency sequence $L_i$ is the low-frequency component of the target sequence $L_{i-1}$. The high-frequency sequence $H_i$ is the high-frequency component of the target sequence $L_{i-1}$. The part of the high-frequency sequence $H_i$ that is not smaller than a preset threshold is retained, and a new high-frequency sequence $H'_i$ is generated. The low-frequency sequence $L_i$ of the i-th round is determined as a new target sequence until the cycle ends.

In an embodiment, in order to perform the variational modal decomposition on the load sequence, the modal decomposition module 53 is configured to: normalize the load sequence, and perform the variational mode decomposition on the normalized load sequence. In order to determine the load value on the forecast date according to the forecasting results of all the forecasting models, the forecast module 54 is configured to: de-normalize the forecasting results of all the forecasting models and determine the load value on the forecast date by combining the denormalized forecasting results of all the forecasting models.

In addition, an electronic device is also provided according to an embodiment of the present application. The electronic equipment includes a bus, a transceiver, a memory, a processor, and a computer program stored in the memory and executable on the processor. The transceiver, the memory and the processor are connected to each other via the bus. The computer program, when executed by the processor, implements the steps in the method for forecasting the electric load described above, and can achieve the same technical effects, which are not described in detail here in order to avoid repetition.

Figure 6:
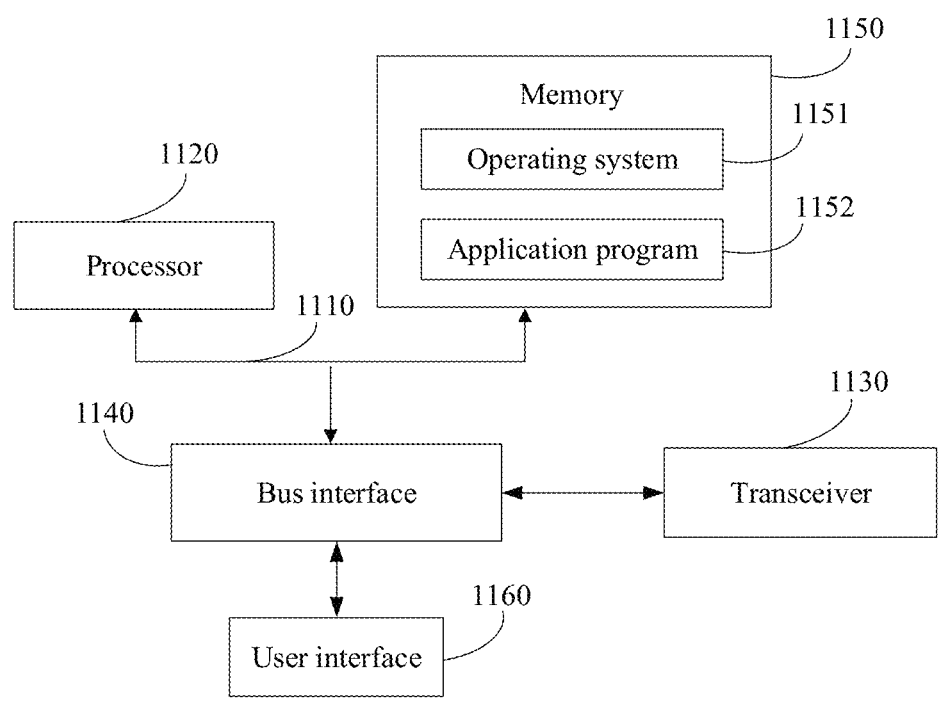
FIG. 6 schematically shows a structural diagram of an electronic device for performing the method for forecasting the electric load according to an embodiment of the present application.

Specifically, referring to FIG. 6, the electronic device is further provided according to an embodiment of the present disclosure. The electronic device includes a bus 1110, a processor 1120, a transceiver 1130, a bus interface 1140, a memory 1150, and a user interface 1160.

In an embodiment of the present disclosure, the electronic device further includes a computer program stored in the memory 1150 and executable on the processor 1120. The computer program, when executed by the processor 1120, implements the method for forecasting the electric load.

The transceiver 1130 is configured to receive and transmit data under control of the processor 1120.

In the embodiment of the present disclosure, a bus structure (represented by the bus 1110) includes any number of interconnected buses and bridges. The bus 1110 connects various circuits including one or more processors represented by the processor 1120 and a memory represented by the memory 1150 together.

The bus 1110 represents one or more of any one of several types of bus structures, including a memory bus and a memory controller, a peripheral bus, an accelerated graphic port (AGP), a processor or a local bus using any bus structure among various bus architectures. For illustration rather than limitation, such architectures include: an industry standard architecture (ISA) bus, a micro channel architecture (MCA) bus, an extended ISA (EISA) bus, a video electronics standard association (VESA), and a peripheral component interconnect (PCI) bus.

The processor 1120 may be an integrated circuit chip with signal processing capabilities. In implementation, each step of the foregoing method embodiment may be completed by an integrated logic circuit of hardware or instructions in the form of software in the processor. The processor includes: a general-purpose processor, a central processing unit (CPU), a network processor (NP), a digital signal processor (DSP), an application specific integrated circuit (ASIC), a field programmable gate array (FPGA), a complex programmable logic device (CPLD), a programmable logic array (PLA), a microcontroller unit (MCU) or other programmable logic device, a discrete gate, a transistor logic device, a discrete hardware component. The methods, steps, and logical block diagrams disclosed in the embodiments of the present disclosure may be implemented or performed. For example, the processor may be a single-core processor or a multi-core processor, and the processor may be integrated on a single chip or located on various chips.

The processor 1120 may be a microprocessor or any conventional processor. The steps of the method disclosed in the embodiments of the present disclosure may be directly performed and completed by a hardware decoding processor, or may be performed and completed by a combination of hardware and software modules in the decoding processor. The software module may be located in a readable storage medium known in the art such as a random-access memory (RAM), a flash memory, a read-only memory (ROM), a programmable read-only memory (PROM), an erasable programmable read-only memory (EPROM), and a register. The readable storage medium is located in the memory. The processor reads the information in the memory and completes the steps of the above method in combination with its hardware.

The bus 1110 further connects various other circuits such as a peripheral device, a voltage regulator, or a power management circuit, and the bus interface 1140 provides an interface between the bus 1110 and the transceiver 1130, which are well known in the art. Therefore, the bus 1110 and the bus interface 1140 are not further described in the embodiments of the present disclosure.

The transceiver 1130 may including one element or multiple elements, e.g., multiple receivers and transmitters, and provide a unit for communicating with various other devices on a transmission medium. For example, the transceiver 1130 receives external data from other devices, and sends the data processed by the processor 1120 to other devices. Depending on the nature of the computer system, a user interface 1160 may also be provided, including a touch screen, a physical keyboard, a display, a mouse, a speaker, a microphone, a trackball, a joystick, and a stylus.

It should be understood that, in the embodiments of the present disclosure, the memory 1150 may further include a memory remotely set with respect to the processor 1120. The remotely set memory may be connected to the server through a network. One or more parts of the above-mentioned network may be an ad hoc network, an intranet, an extranet, a virtual private network (VPN), a local area network (LAN), a wireless local area network (WLAN), a wide area network (WAN), a wireless wide area network (WWAN), a metropolitan area network (MAN), the Internet (Internet), a public switched telephone network (PSTN), an plain old telephone service network (POTS), a cellular telephone network, a wireless network, a wireless fidelity (Wi-Fi) network and a combination of two or more of the aforementioned networks. For example, the cellular telephone network and the wireless network each may be a global mobile communications (GSM) system, a code division multiple access (CDMA) system, a global interconnection for microwave access (WiMAX) system, a general packet radio service (GPRS) system, a broadband code division multiple access (WCDMA) system, a long-term evolution (LTE) system, an LTE frequency division duplex (FDD) system, an LTE time division duplex (TDD) system, an advanced long term evolution (LTE-A) system, a universal mobile telecommunications (UMTS) system, an enhanced mobile broadband (eMBB) system, a massive machine type of communication (mMTC) system, a ultra-reliable low latency communications (uRLLC) system and the like.

It should be understood that the memory 1150 in the embodiment of the present disclosure may be a volatile memory or a non-volatile memory, or may include both a volatile memory and a non-volatile memory. The non-volatile memory includes: a read-only memory (ROM), a programmable read-only memory (PROM), ab erasable programmable read-only memory (EPROM), an electrically erasable programmable read-only memory (EEPROM) or a flash memory.

The volatile memory includes: a random-access memory (RAM), which serves as an external cache. For illustration rather than limitation, various RAM are available, such as: a static random-access memory (SRAM), a dynamic random-access memory (DRAM), a synchronous dynamic random-access memory (SDRAM), a double data rate synchronous dynamic random-access memory (DDRSDRAM), an enhanced synchronous dynamic random-access memory (ESDRAM), a synchronous link dynamic random-access memory (SLDRAM) and a direct Rambus random access memory (DRRAM).

In the embodiments of the present disclosure, the memory 1150 stores the following elements of an operating system 1151 and an application program 1152: executable modules, data structures, or a subset thereof, or an extension set thereof.

Specifically, the operating system 1151 includes various system programs, such as a framework layer, a core library layer, a driver layer and the like, for implementing various basic services and processing hardware-based tasks. The application program 1152 includes various application programs, such as a media player and a browser, for implementing various application services. A program that implements the method of the embodiments of the present disclosure may be included in the application program 1152. The application program 1152 includes: an applet, an object, a component, logic, a data structure, and other computer system executable instructions that perform specific tasks or implement specific abstract data types.

In addition, a computer-readable storage medium on which a computer program is stored is further provided according to an embodiment of the present disclosure. When the computer program is executed by the processor, steps of the method for forecasting the electric load are implemented, and the same technical effects can be achieved. In order to avoid repetition, details are not repeated here.

The computer-readable storage medium includes permanent and non-permanent, removable and non-removable media, and is a tangible device that retains and stores instructions executed by an instruction execution device. The computer-readable storage medium includes: an electronic storage device, a magnetic storage device, an optical storage device, an electromagnetic storage device, a semiconductor storage device, and any suitable combination of the foregoing. The computer-readable storage medium includes: a phase change memory (PRAM), a static random access memory (SRAM), a dynamic random access memory (DRAM), other types of random access memory (RAM), a read-only memory (ROM), a non-volatile random access memory (NVRAM), an electrically erasable programmable read-only memory (EEPROM), a flash memory or other memories, a compact disc read-only memory (CD-ROM), a digital versatile disc (DVD) or other optical storage device, a magnetic cassette memory, a magnetic tape disk memory or other magnetic storage devices, a memory stick, a mechanical encoding device (such as a punched card or raised structure in a groove on which instructions are recorded) or any other non-transmission medium, and is configured to store information that can be accessed by a computing device. According to the definition in the embodiments of the present disclosure, the computer-readable storage medium does not include temporary signals, such as radio waves or other freely transmitted electromagnetic waves, electromagnetic waves transmitted through waveguides or other transmission media (e.g., a light pulse passing through an optical fiber cable) or electrical signals transmitted through wires.

In the embodiments of the present disclosure, it should be understood that the disclosed device, electronic device, and method may be implemented in other ways. For example, the device embodiments described above are only illustrative. For example, the division of the modules or units is only a logical function division, and there may be other division manners in actual implementation. For example, multiple units or components may be combined or integrated into another system, or some features may be omitted or not implemented. In addition, the shown or discussed mutual coupling or direct coupling or communication connection may be indirect coupling or communication connection through some interfaces, devices or units, and may also be electrical, mechanical or other forms of connection.

The units described as separate components may or may not be physically separate. Components shown as units may or may not be a physical unit, that is, may be located in one position or distributed on multiple network units. Some or all of the units may be selected according to actual needs to solve the problems to be solved by the solutions of the embodiments of the present disclosure.

In addition, the functional units in the various embodiments of the present disclosure may be integrated into one processing unit, or the units may separate physically, or two or more units may be integrated into one unit. The above-mentioned integrated unit may be implemented in the form of hardware or software functional unit.

If the integrated unit is implemented in the form of a software functional unit and sold or used as an independent product, the integrated unit may be stored in a computer-readable storage medium. Based on this understanding, the technical solutions of the embodiments of the present disclosure are essentially or a part that contributes to the conventional technology, or all or part of the technical solutions may be embodied in the form of a computer software product. The computer software product is stored in a storage medium and includes a number of instructions so that a computer device (such as a personal computer, a server, a data center or other network devices) execute all or part of the steps of the method described in the embodiments of the present disclosure. The aforementioned storage medium includes various media capable of storing program codes as listed above.

In the description of the embodiments of the present disclosure, those skilled in the art should understand that the embodiments of the present disclosure may be implemented as a method, an apparatus, an electronic device, and a computer-readable storage medium. Therefore, the embodiments of the present disclosure may be specifically implemented in the following forms: complete hardware, complete software (including firmware, resident software, microcode and the like), and a combination of hardware and software. In addition, in some embodiments, the embodiments of the present disclosure may also be implemented in the form of a computer program product in one or more computer-readable storage media, and the computer-readable storage medium includes computer program codes.

The aforementioned computer-readable storage medium may adopt any combination of one or more computer-readable storage media. The computer-readable storage medium includes: an electrical, magnetic, optical, electromagnetic, infrared, or semiconductor system, device, or device, or any combination of the above. More specific examples of computer-readable storage media include: a portable computer disk, a hard disk, a random-access memory (RAM), a read-only memory (ROM), an erasable programmable read-only memory (EPROM), a flash memory, an optical fiber, a compact disc read-only memory (CD-ROM), an optical storage device, a magnetic storage device or any combination of the above. In the embodiments of the present disclosure, the computer-readable storage medium may be any tangible medium that includes or stores a program, and the program may be executed by an instruction execution system, apparatus, or device, or in combination therewith.

The computer program code included in the above-mentioned computer-readable storage medium may be transmitted by any suitable medium, including: a wireless medium, a wired medium, an optical cable, radio frequency (RF), or any suitable combination of the above.

The computer program codes for implementing the operations in the embodiments of the present disclosure may be written in the form of assembly instructions, instruction set architecture (ISA) instructions, machine instructions, machine-related instructions, microcode, firmware instructions, state setting data, integrated circuit configuration data, or in one or more programming languages or a combination thereof. The programming language includes object-oriented programming languages, such as Java, Smalltalk, and C++, as well as conventional procedural programming languages, such as C language or similar programming languages. The computer program codes may be executed entirely on the user computer, partly on the user computer, executed as an independent software package, partly on the user computer and partly on a remote computer, and completely executed on a remote computer or server. In the case of a remote computer, the remote computer can be connected to a user computer or an external computer through any kind of network, including: a local area network (LAN) or a wide area network (WAN).

The embodiments of the present disclosure describe the provided method, device, and the electronic device through flowcharts and/or block diagrams.

It should be understood that each block in the flowcharts and/or block diagrams and the combination of blocks in the flowcharts and/or block diagrams may be implemented by computer readable program instructions. These computer-readable program instructions may be provided to the processor of a general-purpose computer, a special-purpose computer, or other programmable data processing device, to produce a machine. These computer-readable program instructions are executed by a computer or other programmable data processing device to generate a device that implements the functions/operations specified by the blocks in the flowcharts and/or block diagrams.

These computer-readable program instructions may also be stored in a computer-readable storage medium that can operate a computer or other programmable data processing device in a specific manner. In this way, the instructions stored in the computer-readable storage medium produce an instruction device product that includes the functions/operations specified in the blocks in the flowcharts and/or block diagrams.

Alternatively, the computer-readable program instructions are loaded onto a computer, other programmable data processing device, or other device, so that a series of operation steps are executed on the computer, other programmable data processing device, or other device to produce a computer-implemented process, so that the instructions executed on the computer or other programmable data processing device can provide a process for implementing the functions/operations specified by the blocks in the flowcharts and/or block diagrams.

Specific implementations of the embodiments of the present disclosure are described above, and the scope of protection of the embodiments of the present disclosure is not limited thereto. Any person skilled in the art can easily conceive of changes or substitutions within the technical scope disclosed in the embodiments of the present disclosure, and these changes or substitutions should be covered by the scope of protection of the embodiments of the present disclosure. Therefore, the scope of protection of the embodiments of the present disclosure should be subject to the protection scope of the claims.

The invention claimed is:

1. A method for forecasting an electric load, comprising:
acquiring historical load data prior to a forecast date, wherein the historical load data comprises load values at a plurality of times;
generating a load sequence based on the historical load data;
performing variational mode decomposition on the load sequence, to obtain a plurality of intrinsic mode components and a residual that are corresponding to the load sequence;
inputting the plurality of intrinsic mode components and the residual into respective forecasting models, and determining a load value on the forecast date based on forecasting results of all the forecasting models; and
controlling an integrated energy management system to start or stop on the forecast date based on the load value on the forecast date;
wherein the generating the load sequence based on the historical load data comprises:
converting the historical load data into a historical load sequence; and
denoising the historical load sequence to generate the load sequence, wherein the denoising the historical load sequence to generate the load sequence comprises:
performing n rounds of decomposition on a target sequence until a cycle ends, wherein the target sequence of a first round is the historical load sequence, and n is the number of the intrinsic mode components; and
generating the load sequence by combining a low-frequency sequence $L_n$ in a last round and high-frequency sequences newly generated in all the n rounds, wherein an i-th round of decomposition comprises: decomposing a target sequence $L_{i-1}$ of the i-th round into a low-frequency sequence $L_i$ and a high-frequency sequence $H_i$, wherein the low-frequency sequence $L_i$ is a low-frequency component of the target sequence $L_{i-1}$, and the high-frequency sequence $H_i$ is a high-frequency component of the target sequence $L_{i-1}$; retaining a part of the high-frequency sequence $H_i$ that is not smaller than a preset threshold, and newly generating a high-frequency sequence $H'_i$;
and determining the low-frequency sequence $L_i$ of the i-th round as the target sequence in a next round until the cycle ends.

2. The method according to claim 1, wherein the acquiring the historical load data prior to the forecast date comprises:
acquiring raw load data prior to the forecast date; and
replacing an outlier in the raw load data to generate the historical load data.

3. The method according to claim 2, wherein the replacing the outlier in the raw load data comprises:
determining a first normal value earlier than the outlier and closest to the outlier, and determining a second normal value later than the outlier and closest to the outlier; and
determining a value that is to replace the outlier based on the first normal value and the second normal value, wherein the determined value satisfies:

$$Y(t_k) = \frac{t_b - t_k}{t_b - t_a} Y(t_a) + \frac{t_k - t_a}{t_b - t_a} Y(t_b)$$

wherein $t_k$ represents a time corresponding to the outlier, $Y(t_k)$ represents the value that is to replace the outlier, $t_a$ represents a time corresponding to the first normal value, $Y(t_a)$ represents the first normal value, $t_b$ represents a time corresponding to the second normal value, and $Y(t_b)$ represents the second normal value.

4. The method according to claim 1, wherein
the performing the variational mode decomposition on the load sequence comprises: normalizing the load sequence, and performing the variational mode decomposition on the normalized load sequence, and wherein
the determining the load value on the forecast date based on the forecasting results of all the forecasting models comprises: de-normalizing the forecasting results of all the forecasting models and determining the load value on the forecast date by combining the denormalized forecasting results of all the forecasting models.

5. A device for forecasting an electric load, comprising:
an acquisition module configured to acquire historical load data prior to a forecast date, wherein the historical load data comprises load values at a plurality of times;
a sequence generation module configured to generate a load sequence based on the historical load data;
a mode decomposition module configured to perform variational mode decomposition on the load sequence, to obtain a plurality of intrinsic mode components and a residual that are corresponding to the load sequence; and
a forecast module configured to input the plurality of intrinsic mode components and the residual into respective forecasting models, to determine a load value on the forecast date based on forecasting results of all the forecasting models, and control an integrated energy management system to start or stop on the forecast date based on the load value on the forecast date wherein the sequence generation module comprises:
a conversion unit configured to convert the historical load data into a historical load sequence; and
a denoising unit configured to denoise the historical load sequence to generate the load sequence, wherein the denoising unit is configured to, in order to denoise the historical load sequence to generate the load sequence, perform n rounds of decomposition on a target sequence until a cycle ends, wherein the target sequence of the first round is the historical load sequence, and n is the number of the intrinsic mode components; and generate the load sequence by combining a low-frequency sequence $L_n$ in a last round and high-frequency sequences newly generated in all the rounds, wherein an i-th round of decomposition comprises: decomposing a target sequence $L_{i-1}$ of the i-th round into a low-frequency sequence $L_i$ and a high-frequency sequence $H_i$, wherein the low-frequency sequence $L_i$ is a low-frequency component of the target sequence $L_{i-1}$, and the high-frequency sequence $H_i$ is a high-frequency component of the target sequence $L_{i-1}$; retaining a part of the high-frequency sequence $H_i$ that is not smaller than a preset threshold, and newly generating a high-frequency sequence $H'_i$; and determining the low-frequency sequence $L_i$ of the i-th round as the target sequence in a next round until the cycle ends.

6. The device according to claim 5, wherein the acquisition module comprises:
an acquisition unit configured to acquire raw load data prior to the forecast date; and
a replacement unit configured to replace an outlier in the raw load data to generate the historical load data.

7. A non-transitory computer-readable storage medium, on which a computer program is stored, wherein the computer program, when executed by a processor, causes the processor to implement:
acquiring historical load data prior to a forecast date, wherein the historical load data comprises load values at a plurality of times;
generating a load sequence based on the historical load data;
performing variational mode decomposition on the load sequence, to obtain a plurality of intrinsic mode components and a residual that are corresponding to the load sequence;
inputting the plurality of intrinsic mode components and the residual into respective forecasting models, and determining a load value on the forecast date based on forecasting results of all the forecasting models; and
controlling an integrated energy management system to start or stop on the forecast date based on the load value on the forecast date;
wherein the generating the load sequence based on the historical load data comprises:
converting the historical load data into a historical load sequence; and
denoising the historical load sequence to generate the load sequence, wherein the denoising the historical load sequence to generate the load sequence comprises:
performing n rounds of decomposition on a target sequence until a cycle ends, wherein the target sequence of a first round is the historical load sequence, and n is the number of the intrinsic mode components; and
generating the load sequence by combining a low-frequency sequence $L_n$ in a last round and high-frequency sequences newly generated in all the n rounds, wherein an i-th round of decomposition comprises: decomposing a target sequence $L_{i-1}$ of the i-th round into a low-frequency sequence $L_i$ and a high-frequency sequence $H_i$, wherein the low-frequency sequence $L_i$ is a low-frequency component of the target sequence $L_{i-1}$, and the high-frequency sequence $H_i$ is a high-frequency component of the target sequence $L_{i-1}$; retaining a part of the high-frequency sequence $H_i$ that is not smaller than a preset threshold, and newly generating a high-frequency sequence $H'_i$;
and determining the low-frequency sequence $L_i$ of the i-th round as the target sequence in a next round until the cycle ends.

* * * * *